United States Patent
Neumann et al.

(10) Patent No.: US 12,312,986 B2
(45) Date of Patent: May 27, 2025

(54) ELECTRICAL SUPPLY LINE CONNECTION UNIT SUITABLE FOR HARSH HIGH HEAT ENVIRONMENTAL CONDITIONS

(71) Applicant: Purem GmbH, Neunkirchen (DE)

(72) Inventors: Felix Neumann, Aichwald (DE); Jan Haenisch, Neuhausen a.d. Fildern (DE); Christian Schneider, Stuttgart (DE); Veronique Guerin, Stuttgart (DE); Johannes Grupp, Donzdorf (DE)

(73) Assignee: Purem GmbH, Neunkirchen (DE)

( * ) Notice: Subject to any disclaimer, the term of this patent is extended or adjusted under 35 U.S.C. 154(b) by 982 days.

(21) Appl. No.: 17/245,836

(22) Filed: Apr. 30, 2021

(65) Prior Publication Data

US 2021/0340894 A1    Nov. 4, 2021

(30) Foreign Application Priority Data

Apr. 30, 2020 (DE) ...................... 10 2020 111 777.9

(51) Int. Cl.
*H01R 4/70* (2006.01)
*F01N 3/20* (2006.01)
(Continued)

(52) U.S. Cl.
CPC ............. *F01N 3/2013* (2013.01); *H01R 4/30* (2013.01); *H01R 4/70* (2013.01); *H05B 3/08* (2013.01);
(Continued)

(58) Field of Classification Search
CPC . H01R 4/34; H01R 4/70; H01R 11/12; H01R 2201/26
See application file for complete search history.

(56) References Cited

U.S. PATENT DOCUMENTS 5,935,473 A    8/1999 Hashimoto et al.
6,109,946 A *  8/2000 Hotz ................ H01R 4/56
                                                          422/174
(Continued)

FOREIGN PATENT DOCUMENTS

CN    101785151 A    7/2010
CN    101874277 A    10/2010
(Continued)

OTHER PUBLICATIONS

Office action of the Chinese Patent Office dated Aug. 29, 2023 in corresponding Chinese patent application 202110477222.2.
(Continued)

*Primary Examiner* — Vanessa Girardi
(74) *Attorney, Agent, or Firm* — Walter Ottesen, P.A.

(57) ABSTRACT

A connection unit connects an electrical supply line to a connection element of a heatable exhaust gas system. The connection unit has a housing having a connection element receiving region extending in the direction of a first housing axis ($G_1$) and a supply line receiving region extending in the direction of a second housing axis ($G_2$). The connection element receiving region is open in a first axial connection element receiving region end region for receiving the connection element protruding from an exhaust gas system and is closed off in a second axial connection element receiving region end region. The supply line receiving region is open to the connection element receiving region in a first axial supply line receiving region end region and is open in a second supply line receiving region end region for receiving an electrical supply line.

17 Claims, 2 Drawing Sheets

(51) Int. Cl.
*H01R 4/30* (2006.01)
*H01R 4/34* (2006.01)
*H01R 11/12* (2006.01)
*H05B 3/08* (2006.01)

(52) U.S. Cl.
CPC ............ *H01R 4/34* (2013.01); *H01R 11/12* (2013.01); *H01R 2201/26* (2013.01)

(56) References Cited

U.S. PATENT DOCUMENTS

| | | | |
|---|---|---|---|
| 9,209,582 B2 * | 12/2015 | Kashiwada | H01R 13/6315 |
| 9,225,107 B2 * | 12/2015 | Hirth | H01R 4/302 |
| 10,465,583 B2 | 11/2019 | Nakamura et al. | |
| 2008/0314616 A1 | 12/2008 | Benestad et al. | |
| 2010/0206630 A1 | 8/2010 | Benestad et al. | |
| 2010/0258347 A1 | 10/2010 | Roseen et al. | |
| 2012/0194981 A1 | 8/2012 | Kempf et al. | |

FOREIGN PATENT DOCUMENTS

| | | |
|---|---|---|
| CN | 102155280 A | 8/2011 |
| CN | 102614587 A | 8/2012 |
| CN | 204361442 U | 5/2015 |
| DE | 696 15 252 T2 | 6/2002 |
| EP | 0 739 152 A1 | 10/1996 |
| EP | 3 299 599 A1 | 3/2018 |
| JP | 2001-82129 A | 3/2001 |
| JP | 2017-101642 A | 6/2017 |

OTHER PUBLICATIONS

English translation of the Office action of the Chinese Patent Office dated Jun. 28, 2024 in corresponding Chinese patent application 202110477222.2.

* cited by examiner

ELECTRICAL SUPPLY LINE CONNECTION UNIT SUITABLE FOR HARSH HIGH HEAT ENVIRONMENTAL CONDITIONS

CROSS REFERENCE TO RELATED APPLICATION

This application claims priority of German patent application no. 10 2020 111 777.9, filed Apr. 30, 2020, the entire content of which is incorporated herein by reference.

TECHNICAL FIELD

The present invention relates to a connection unit for the connection of an electrical supply line to a connection element of a heatable exhaust gas system.

BACKGROUND

In order rapidly to bring an exhaust gas treatment unit, such as, for example, a particle filter, catalytic converter, in particular an oxidation catalytic converter or SCR catalytic converter, arranged in an exhaust gas system of a combustion engine of a vehicle, in particular in a starting phase of combustion operation of a combustion engine, to a temperature suitable for the exhaust gas treatment that is to be carried out, it is known to associate electrically operated heating devices with such exhaust gas treatment units. Such heating devices can be in the form of, for example, an exhaust gas heater, arranged upstream with respect to such an exhaust gas treatment unit, having a heating conductor, by means of which the exhaust gas which is to flow to the exhaust gas after-treatment unit is warmed and the heat taken up therein is transmitted to the exhaust gas treatment unit which then follows downstream.

In order to be able to connect such heating devices to a source of electrical energy, generally a battery provided in a vehicle, or an on-board voltage system, connection elements are provided on an exhaust gas routing component receiving such a heating device, to which connection elements electrical supply lines can be connected. The connection of such supply lines to the associated connection elements takes place on the outer side of the exhaust gas routing component receiving such a heating device, which outer side is in principle outwardly exposed to the environment, so that the region in which that connection is established is exposed to environmental influences.

SUMMARY

An object of the present invention is to provide a connection unit for the connection of an electrical supply line to a connection element of a heatable exhaust gas system, with which, with a structurally simple form, reliable shielding of the region in which an electrical connection between a supply line and a connection element is established is ensured.

This object is achieved according to the invention by a connection unit for the connection of an electrical supply line to a connection element of a heatable exhaust gas system, comprising a connection unit housing having a connection element receiving region extending in the direction of a first housing axis and a supply line receiving region extending in the direction of a second housing axis, wherein the connection element receiving region is open in a first axial connection element receiving region end region for receiving a connection element protruding from an exhaust gas system and is closed off in a second axial connection element receiving region end region, wherein the supply line receiving region is open to the connection element receiving region in a first axial supply line receiving region end region and is open in a second supply line receiving region end region for receiving an electrical supply line.

By means of the connection unit housing, which encapsulates the two components that are to be electrically connected together, that is, the connection element and the supply line, the region in which the electrically conducting connection is established is outwardly shielded from environmental influences, so that in particular the risk of a short circuit produced by spray water or the like is also avoided.

In a form that is simple to implement even with a comparatively complex shaping of the connection unit housing, it is proposed that the connection unit housing is constructed with two housing shells which are connected together in a connection edge region, wherein each housing shell has a first housing shell portion for providing the connection element receiving region and a second housing shell portion for providing the supply line receiving region.

For reasons of mechanical strength and heat resistance, the connection unit housing can be constructed at least partially from sheet-metal material.

In order to achieve a reliable shielding effect in the region adjoining the outer circumference of an exhaust gas system, it is proposed that the connection unit housing has in the first axial connection element receiving region end region an exhaust gas system connection edge which protrudes radially outwards with respect to the first housing axis and has an exhaust gas connection surface which surrounds the first housing axis in an annular manner and is to be positioned facing a counter connection surface of an exhaust gas system.

For a structurally simple form of the connection unit housing, the exhaust gas system connection surface can thereby lie in a plane orthogonal to the first housing axis.

In particular when an exhaust gas routing component, from which there protrudes outwards a connection element that is to be electrically connected, is in tubular form and thus has a curved outer circumferential surface, it is advantageous for obtaining a good shielding effect if the exhaust gas system connection surface is curved, preferably about an axis of curvature which is orthogonal to the first housing axis. This axis of curvature can correspond, for example, to a longitudinal center axis of the tubular exhaust gas routing component.

In order to permit access to the region in which the electrical connection between a connection element and an associated supply line is to be established, it is proposed that the connection element receiving region is closed off in the second axial connection element receiving region end region by a cover. The cover is preferably held on the connection unit housing by positive engagement so that, in order to establish or release the connection, it can in a simple manner repeatedly be removed from the connection unit housing or fitted thereto.

In order to provide both electrical and thermal insulation between the connection unit housing and the connection element there can be arranged in the connection element receiving region a first insulating element which supports the connection unit housing with respect to a connection element that is to be received in the connection element receiving region.

Since the insulating element and the connection unit housing are generally constructed from different materials, it is proposed that the first insulating element is held on the connection unit housing by positive engagement.

In order to establish supporting interaction with respect to the connection element, the first insulating element can have a connection element receiving opening.

When the first insulating element is constructed with ceramics material, it provides both excellent electrical insulation and excellent thermal insulation. Other materials, such as, for example, mica material, can also be used for constructing such an insulating element.

In order to introduce electrical and thermal insulation also between the connection unit housing and the supply line, it is proposed that there is arranged in the supply line receiving region a second insulating element which supports the connection unit housing with respect to a supply line that is to be received in the supply line receiving region.

Here too, it is advantageous for the use of different materials if the second insulating element is held on the connection unit housing by positive engagement. For support with respect to the connection element, the second insulating element can have a supply line receiving opening. The second insulating element can also be constructed with ceramics material or a similar material, such as, for example, mica material.

For a compact construction of the connection unit, it is proposed that the second housing axis is substantially orthogonal to the first housing axis.

The present invention relates further to an exhaust gas system for a combustion engine, comprising an exhaust gas routing component, at least one connection element, carried on the exhaust gas routing component, for the connection of an electrical supply line and, in association with the at least one connection element, a connection unit constructed according to the invention for the connection of the electrical supply line associated with the at least one connection element to that connection element.

In order to be able to establish electrical contact between the connection element and the supply line inside the connection unit housing, the at least one connection element can be received in the connection element receiving region of the connection unit associated with that connection element, and the supply line associated with the at least one connection element can be received in the supply line receiving region of the connection unit associated with that connection element in such a manner that a connection end of that supply line extends into the connection element receiving region and is electrically conductively connected to the connection element. Electrical contact is accordingly established substantially in the connection element receiving region.

For an electrical connection which is simple to establish but nevertheless stable, there can be provided at the connection end of the supply line a connection eyelet which is pushed onto the connection element and fixed thereon by screwing.

For stable holding of the connection unit on the exhaust gas system it is proposed that the connection unit is supported with respect to the exhaust gas system, preferably with respect to the connection element, by the first insulating element. In particular, it can thereby be provided that the first insulating element is held on the exhaust gas system by means of a threaded member which fixes the supply line to the connection element.

The exhaust gas system connection surface can be located opposite a curved outer circumferential surface, providing the counter connection surface, of the exhaust gas routing component and thus adapted to the curved outer circumferential surface of the exhaust gas routing component.

In an alternative embodiment it can be provided that the exhaust gas system connection surface is located opposite the non-curved counter connection surface on the connection element or on the exhaust gas routing component.

BRIEF DESCRIPTION OF THE DRAWINGS

The invention will now be described with reference to the drawings wherein.

DESCRIPTION OF THE PREFERRED EMBODIMENTS

Figure 1:
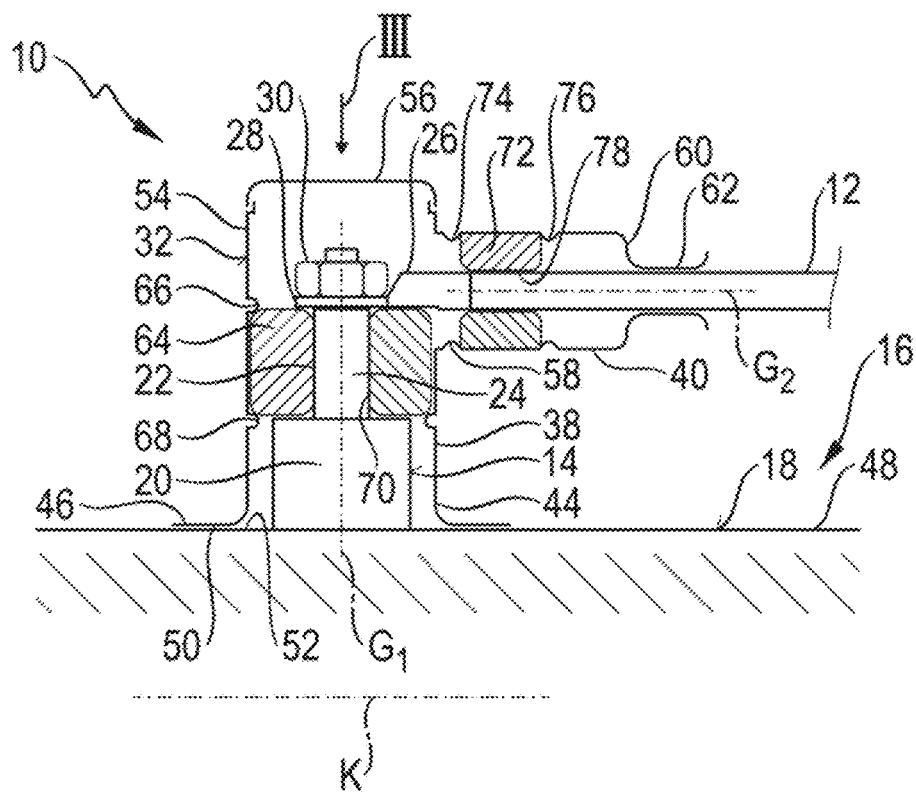
FIG. 1 is a section view of an exhaust gas system having a connection unit for the connection of a supply line to a connection element of the exhaust gas system.

FIG. 1 shows a first embodiment of a connection unit, designated generally 10, with which an electrical supply line 12 can be connected to a connection element 14 of an exhaust gas system designated generally 16. The exhaust gas system 16 can comprise a tubular exhaust gas routing component 18 in which exhaust gas flows to an exhaust gas treatment unit, for example a particle filter, an oxidation catalytic converter or an SCR catalytic converter. An electrically operated heating device can be arranged in the exhaust gas routing component 18 for warming the exhaust gas which is to flow to the exhaust gas treatment unit, or the exhaust gas treatment unit. The heating device can comprise a heating conductor which is warmed when an electrical voltage is applied and thus releases heat to its environment. The two connection ends of the heating conductor are each electrically connected to a connection element 14 carried on the exhaust gas routing component 18. Each such connection element 14 can comprise, for example, a jacket element 20 fixed to the exhaust gas routing component 18 in a gas-tight manner, for example by welding, and a conductor element 22 held in an electrically insulated manner therein, of which the end 24 that protrudes outwards beyond the exhaust gas routing component 18, or the jacket element 20, is to be electrically connected to the supply line 12.

For this purpose, the supply line 12 has at a connection end 26 a connection eyelet 28 which is pushed over the end 24, provided with an external thread, of the conductor element 22 and fixed in the manner described hereinbelow by a threaded member 30, in the embodiment shown a nut, on the connection element 14 in order to establish the electrical connection.

The connection unit 10 comprises a connection unit housing 32, which in the embodiment shown is configured with two housing shells 34, 36 each constructed as shaped sheet-metal parts. The two housing shells 34, 36, which are complementary to one another or substantially of mirror-symmetrical construction, together provide a connection element receiving region 38 extending in the direction of a first housing axis $G_1$ and a supply line receiving region 40 extending along a second housing axis $G_2$. For this purpose, each of the two housing shells 34, 36 has a first housing shell portion 34', 36' for providing the connection element receiving region 38 and a second housing shell portion 34", 36" for providing the supply line receiving region 40. The connection element receiving region 38 and the supply line receiving region 40, or their respective longitudinal axes provided by the housing axes $G_1$, $G_2$, are preferably arranged substantially orthogonally to one another so that, in principle, the connection unit housing 32 has an approximately rectangular form.

The two housing shells 34, 36 provided in the form of shaped sheet-metal parts can be fixedly connected together in a connection edge region 42 in which they adjoin one another, for example by hemming or/and by substance-to-substance bonding, that is, for example, by welding.

In a first axial connection element receiving region end region 44, the connection unit housing 32, or the connection element receiving region 38, is axially open for receiving the connection element 14 therein. In this first axial connection element receiving region end region 44 there is provided on the connection unit housing 32 an exhaust gas system connection edge 46 which protrudes radially outwards with respect to the first housing axis $G_1$ and has an exhaust gas system connection surface 50 facing an outer circumferential surface 48 of the exhaust gas routing component 18, or of the exhaust gas system 16. In the case of a tubular, that is, substantially circular, form of the exhaust gas routing component 18, the connection edge 46, or the exhaust gas system connection surface provided thereon, which in principle surrounds the first housing axis $G_1$ in an annular manner, is preferably configured so as to curve about an axis of curvature K, wherein this axis of curvature K can correspond substantially to the longitudinal center axis of the exhaust gas routing component 18 and accordingly also provides the axis of curvature of the outer circumferential surface of the exhaust gas routing component 18, which outer circumferential surface provides a counter connection surface 52 in the region of the connection unit housing 32. A close connection of the connection edge 46 to the exhaust gas routing component 18 is accordingly achieved when the connection unit housing 32 is fixed to the exhaust gas system 16, wherein in this state the connection edge 46 can, for example, contact the exhaust gas routing component 18 or can leave a small, gap-like intermediate space with respect thereto.

In a second axial connection element receiving region end region 54, the connection element receiving region 38 is closed off by a cover 56, which, for example, is likewise constructed from sheet-metal material. The cover 56 can be fixed to the connection unit housing 32 by positive engagement, for example, so that it can be removed from the connection unit housing 32 and fitted thereto again in order to repeatedly establish and release the electrically conducting connection between the supply line 12 and the connection element 14.

The supply line receiving region 40 is open to the connection element receiving region 38 in a first axial supply line receiving region end region 58. In a second axial supply line receiving region end region 60, the supply line receiving region 40, or the connection unit housing 32, forms a passage 62 which is adapted to the external dimension of the supply line 12, so that in this region there is established a connection of the connection unit housing 32 to the supply line 12 that is substantially closed off against the ingress of spray water or dirt.

In the connection element receiving region 38 of the connection unit housing 32 there is arranged a first insulating element 64 of annular form which is made, for example, of ceramics material. The first insulating element is held positively on the connection unit housing 32 by two groove-like indentations 66, 68 formed axially on both ends thereof, so that, even despite the different construction materials for the first insulating element 64 and the connection unit housing 32, a stable connection between those two components is formed. The conductor element 22 of the connection element 14 passes through a connection element receiving opening 70 in the first insulating element 64. The first insulating element 64 is supported axially on the connection element 14, for example, by the jacket element 20 thereof. The connection eyelet 28 is pushed onto the portion of the conductor element 22 protruding beyond the first insulating element 64 and is pressed against the first insulating element 64 by the threaded member 30, whereby the first insulating element 64 is in turn pressed against the connection element 14, or the exhaust gas system 16 generally, and the connection unit 10 is accordingly held in a defined manner with respect to the exhaust gas system 16. As has already been stated, in this state the connection edge 46 can lie against the outer circumferential surface 48 of the exhaust gas routing component 18 or can be at a gap-like distance from that outer circumferential surface.

In the supply line receiving region 40 there is received a second insulating element 72. This second insulating element is also held on the connection unit housing 32 between two groove-like indentations 74, 76 by positive engagement and provides a supply line receiving opening 78 through which the supply line 12 extends and is accordingly held with respect to the connection unit housing 32 in the length region passing through the supply line receiving region 40.

By means of the two insulating elements 64, 72, the connection unit 10 is stably electrically insulated and also thermally insulated with respect to the connection element 14, or the supply line 12 electrically conductively connected thereto. Warming of the connection element 14 and thereby also of the supply line 12, which unavoidably occurs during operation, thus does not lead to excessive warming of the connection unit 10.

Figure 2:
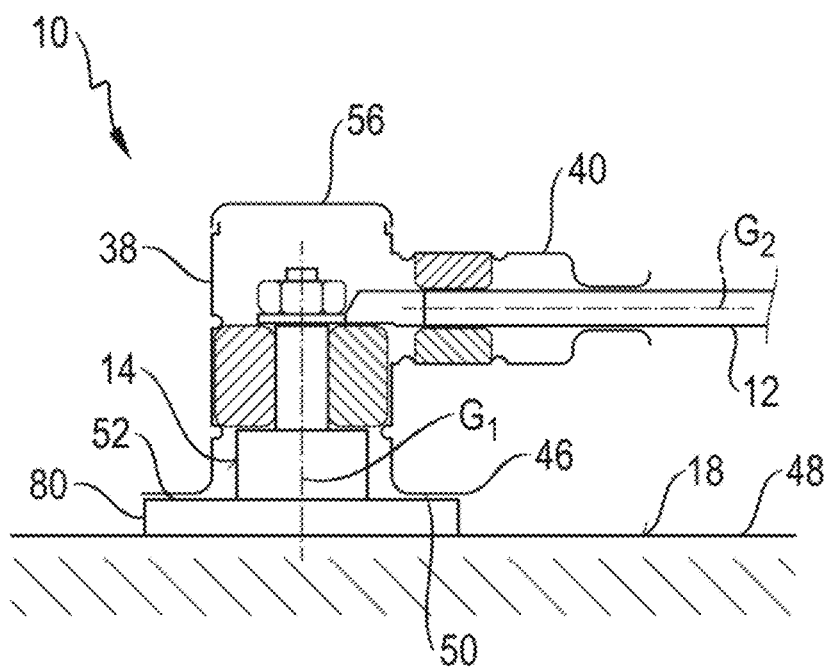
FIG. 2 is a view corresponding to FIG. 1 of an alternative embodiment; and, FIG. 3 is a plan view of the connection unit of FIG. 1 in viewing direction III in FIG. 1.
Figure 3:
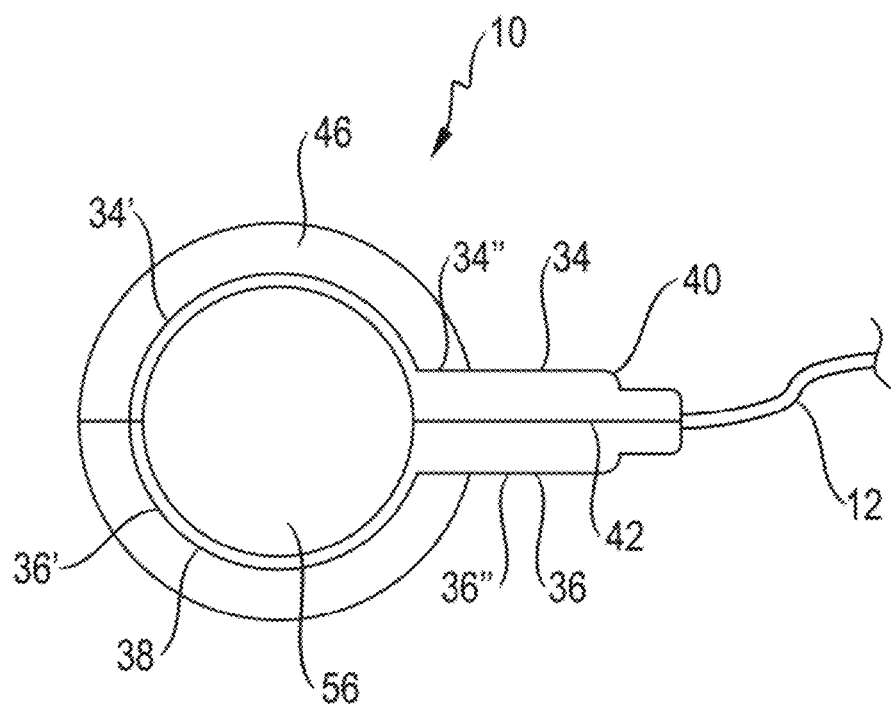

An alternative embodiment is shown in FIG. 2. In that figure, the construction of the connection unit 10 corresponds in principle to the construction described hereinbefore, so that reference may be made to that description.

In association with the connection element 14 there is provided a base 80 which provides the counter connection surface 52. The base can, for example, form part of the connection element 14, in particular of the jacket element 20 thereof, and be formed or connected integrally therewith, for example, but alternatively it can also be provided on the exhaust gas routing component 18.

The counter connection surface 52 provided on the base 80 surrounds the first housing axis $G_1$ in an annular manner and is substantially orthogonal thereto. Correspondingly, the exhaust gas system connection surface 50 provided at the connection edge 46 is likewise formed substantially orthogonally to the first housing axis $G_1$ so that, as is shown in FIG. 2, it lies opposite the counter connection surface 52 at a small, gap-like distance therefrom or is supported thereon.

Owing to the substantially orthogonal orientation of the exhaust gas system connection surface 50 with respect to the first housing axis $G_1$, the construction of the connection unit housing 32, or of the two housing shells 34, 36 which substantially provide the connection unit housing, is simple to achieve.

As a result of the connection unit constructed according to the invention, the region in which a supply line is electrically connected to a connection element of an exhaust gas system is outwardly shielded against environmental influences, in particular against spray water. The risk of an electric short circuit being produced by spray water can thus be ruled out.

The risk of excessive corrosion in the region in which the supply line is connected to an associated connection element of the exhaust gas system is also ruled out as far as possible, so that, even after a prolonged operating period, it is possible, as a result of the access provided by the connection unit according to the invention to the region of that connection, to uncouple the supply line electrically, or mechanically, from the associated connection element. The risk that, when carrying out cleaning or maintenance work with the heating device activated, a connection element will by mistake be touched or a short circuit will be produced by a tool to one of the connection elements or between the two connection elements of a heating device does not exist owing to the jacketing of that region of the electrical connection which is achieved by the connection unit constructed according to the invention.

Alternatively or in addition to providing thermal and electrical insulation by means of the two insulating elements, it is possible to cover the connection unit housing on its inner side at least in some regions with an electrically insulating coating, for example a ceramics coating, in order to avoid direct physical contact between the construction material of the connection unit housing, that is, for example, a sheet-metal material, and the supply line, or the connection element.

In the connection unit according to the invention, as an alternative to the substantially linearly extending form of the connection element receiving region, or of the supply line receiving region, shown in the figures, at least one of those two receiving regions can be curved and thus configured so as to extend along a curved longitudinal axis, wherein a receiving region curved in such a manner likewise has the two axial end regions discussed hereinbefore.

It is understood that the foregoing description is that of the preferred embodiments of the invention and that various changes and modifications may be made thereto without departing from the spirit and scope of the invention as defined in the appended claims.

What is claimed is:

1. A connection unit for releasably connecting an electrical supply line to a connection element protruding from a heatable exhaust gas system, the connection unit comprising:
    a housing having a connection element receiving region extending along a first housing axis and being open at first and second axial ends along said first housing axis;
    said housing further having a supply line receiving region extending along a second housing axis and being open at an axial end thereof for receiving a connection end of the electrical supply line;
    said second housing axis being perpendicular to the first housing axis;
    said connection element receiving region being configured to receive the connection element protruding from the heatable exhaust gas system at said first axial end thereof;
    the connection end of the electrical supply line is secured to said connection element protruding from the heatable exhaust gas system by a threaded member accessible through said second axial end of said connection element receiving region; and,
    a cover configured to releasably engage with said housing at said second axial end of said connection element receiving region for providing access said threaded member for repeatedly establishing and releasing an electro-mechanical connection between the electrical supply line and the connection element.

2. A connection unit for releasably connecting an electrical supply line to a connection element protruding from a heatable exhaust gas system, the connection unit comprising:
    a housing having a connection element receiving region extending along a first housing axis and being open at a proximal end and a distal axial end along said first housing axis;
    said housing having a supply line receiving region extending along a second housing axis and being open at an axial end along said second housing axis for receiving a connection end of the electrical supply line;
    said second housing axis being perpendicular to said first housing axis;
    said connection element receiving region is configured to receive the connection element protruding from the heatable exhaust gas system at the proximal axial end thereof,
    a removable cover closes off said housing at said distal axial end of said connection element receiving region;
    a first insulating element is positioned within said connection element receiving region along said first housing axis and is held by groove-like indentations formed in said housing;
    a second insulating element is positioned within said supply line receiving region along said second housing axis and is held by groove-like indentations formed in said housing; and,
    the connection end of the electrical supply line being removably secured to the connection element protruding from the heatable exhaust gas system for repeatedly establishing and releasing an electro-mechanical connection between the electrical supply line and the connection element.

3. An exhaust gas system for a combustion engine, the exhaust gas system comprising:
    an exhaust gas conducting component;
    at least one connection element carried on said exhaust gas conducting component and protruding from said exhaust gas conducting component;
    a connection unit for connecting an electrical supply line to said at least one connection element;
    said connection unit including:
    a housing defining a first housing axis ($G_1$) and a second housing axis ($G_2$);
    said housing having a connection element receiving region extending in a direction along said first housing axis ($G_1$);
    said housing further having a supply line receiving region extending in a direction along said second housing axis ($G_2$), said electrical supply line being received in said supply line receiving region so as to cause a connection end of said electrical supply line configured to attach to and being electrically connected to said connection element to extend into said connection element receiving region;
    said connection element receiving region being configured to be open in a first axial connection element receiving region end region for receiving said connection element protruding from said exhaust gas conducting component;
    said connection element receiving region being configured to be closed off in a second axial connection element receiving region end region;
    said housing including a cover closing off said connection element receiving region in said second axial connection element receiving region end region;

said supply line receiving region being configured to be open to said connection element receiving region in a first axial supply line receiving region end region and being configured to be open in a second supply line receiving region end region for receiving said electrical supply line;

a first insulating element being arranged in said connection element receiving region and supporting said housing with respect to said connection element received in said connection element receiving region;

a second insulating element being arranged in said supply line receiving region, said second insulating element supporting said housing with respect to said electrical supply line; and said first insulating element having a connection element receiving opening releasably receiving said connection element, said connection end of said electrical supply line being releasably attached to said connection element together with said first insulating element by a threaded member.

4. The exhaust gas system of claim 3, wherein said connection end of said electrical supply line includes an eyelet pushed onto said connection element; and, said threaded member is configured to threadably engage said connection element to fixedly connect said eyelet to said connection element.

5. The exhaust gas system of claim 3, wherein:
said first axial connection element receiving region end region includes an exhaust gas system connection edge protruding radially outwardly with respect to said first housing axis ($G_1$);
said exhaust gas connection edge defines an exhaust gas system annular connection surface surrounding said first housing axis ($G_1$); and,
said annular connection surface is a curved annular connection surface located opposite a curved outer circumferential surface of said exhaust gas conducting component.

6. The exhaust gas system of claim 3, wherein:
said first axial connection element receiving region end region includes an exhaust gas system connection edge protruding radially outwardly with respect to said first housing axis ($G_1$);
said exhaust gas connection edge defines an exhaust gas system annular connection surface surrounding said first housing axis ($G_1$); and,
said annular connection surface is configured to be positioned to face a counter connection surface of said exhaust gas system;
said annular connection surface lies in a plane orthogonal to said first housing axis ($G_1$); and,
said annular connection surface is located opposite a non-curved connection surface on one of said connection element and said exhaust gas conducting component.

7. A connection unit for releasably connecting an electrical supply line to a connection element of a heatable exhaust gas system protruding from the heatable exhaust gas system, the connection unit comprising:
a housing defining a first housing axis ($G_1$) and a second housing axis ($G_2$);
said housing having a connection element receiving region extending in a direction along said first housing axis ($G_1$);
said housing further having a supply line receiving region extending in a direction along second housing axis ($G_2$), said electrical supply line being accommodated in said supply line receiving region;

said connection element receiving region being configured to be open in a first axial connection element receiving region end region for receiving said connection element protruding from said heatable exhaust gas system;

said connection element receiving region being configured to be closed off in a second axial connection element receiving region end region;

said housing including a cover closing off said connection element receiving region in said second axial connection element receiving region end region;

said supply line receiving region being configured to be open to said connection element receiving region in a first axial supply line receiving region end region and being configured to be open in a second supply line receiving region end region for receiving said electrical supply line;

a first insulating element being arranged in said connection element receiving region and being configured for supporting said housing with respect to said connection element protruding from said heatable exhaust gas system for being received in said connection element receiving region;

a second insulating element being arranged in said supply line receiving region; said second insulating element supporting said housing with respect to said electrical supply line; and, said first insulating element having a connection element receiving opening for releasably receiving said connection element and for releasably attaching a connection end of said electrical supply line together with said first insulating element to said connection element by a threaded member.

8. The connection unit of claim 1, wherein said cover is held on said housing via a positive engagement connection.

9. The connection unit of claim 1, wherein at least one of the following:
said first insulating element is held in said housing via a positive engagement connection;
and,
said first insulating element is built up with ceramic material.

10. The connection unit of claim 1, wherein at least one of the following:
said second insulating element is held in said housing via a positive engagement connection;
said second insulating element has a supply line receiving opening; and,
said second insulating element is built up of ceramic material.

11. The connection unit of claim 1, wherein said second housing axis ($G_2$) is substantially orthogonal to said first housing axis ($G_1$).

12. The connection unit of claim 1, said housing including two housing shells mutually connected to conjointly define a common connection edge region; and, said housing shells having respective first housing shell portions to conjointly define said connection element receiving region and having respective second housing shell portions to conjointly define said supply line receiving region.

13. The connection unit of claim 12, wherein said housing is configured at least in part of sheet-metal material.

14. The connection unit of claim 1, wherein:
said first axial connection element receiving region end region includes an exhaust gas system connection edge protruding radially outwardly with respect to said first housing axis ($G_1$);
said exhaust gas connection edge defines an exhaust gas system annular connection surface surrounding said first housing axis ($G_1$); and,
said annular connection surface is configured to be positioned to face a counter connection surface of said exhaust gas system.

15. The connection unit of claim 14, wherein said annular connection surface lies in a plane orthogonal to said first housing axis ($G_1$).

16. The connection unit of claim 14, wherein said annular connection surface is curved.

17. The connection unit of claim 14, wherein said annular connection surface is curved about an axis of curvature (K) orthogonal to said first housing axis ($G_1$).

\* \* \* \* \*